(12) United States Patent
Van Phan et al.

(10) Patent No.: US 9,319,865 B2
(45) Date of Patent: Apr. 19, 2016

(54) APPARATUS AND METHOD OF PROVIDING END-TO-END CALL SERVICES

(75) Inventors: Vinh Van Phan, Oulu (FI); Ling Yu, Oulu (FI); Olli Juhani Piirainen, Oulu (FI); Markku Juha Vainikka, Kiviniemi (FI); Matti Tapani Kiiski, Oulunsalo (FI); Seppo Ilmari Vesterinen, Oulunsalo (FI)

(73) Assignee: Nokia Solutions and Networks Oy, Espoo (FI)

( * ) Notice: Subject to any disclaimer, the term of this patent is extended or adjusted under 35 U.S.C. 154(b) by 765 days.

(21) Appl. No.: 13/383,918

(22) PCT Filed: Jul. 14, 2009

(86) PCT No.: PCT/EP2009/058990
§ 371 (c)(1),
(2), (4) Date: Mar. 12, 2012

(87) PCT Pub. No.: WO2011/006534
PCT Pub. Date: Jan. 20, 2011

(65) Prior Publication Data
US 2012/0164980 A1   Jun. 28, 2012

(51) Int. Cl.
*H04W 4/00* (2009.01)
*H04W 8/08* (2009.01)
*H04L 29/06* (2006.01)
*H04W 12/06* (2009.01)
*H04W 76/02* (2009.01)
*H04W 92/12* (2009.01)
*H04W 4/08* (2009.01)
*H04W 84/12* (2009.01)
*H04W 80/04* (2009.01)
*H04W 84/04* (2009.01)

(52) U.S. Cl.
CPC .......... *H04W 8/082* (2013.01); *H04L 63/0272* (2013.01); *H04L 63/08* (2013.01); *H04L 65/1016* (2013.01); *H04L 65/1069* (2013.01); *H04W 12/06* (2013.01); *H04W 76/022* (2013.01); *H04W 4/08* (2013.01); *H04W 80/04* (2013.01); *H04W 84/045* (2013.01); *H04W 84/12* (2013.01); *H04W 92/12* (2013.01)

(58) Field of Classification Search
CPC ..... H04W 84/045; H04W 4/08; H04W 84/12; H04W 92/12
USPC ............... 370/338, 351, 352; 455/426.1, 445, 455/560, 561
See application file for complete search history.

(56) References Cited

U.S. PATENT DOCUMENTS

| | | | |
|---|---|---|---|
| 2002/0082006 A1 | 6/2002 | Narvanen et al. | 455/426 |
| 2005/0220055 A1* | 10/2005 | Nelson et al. | 370/331 |
| 2007/0230447 A1 | 10/2007 | Hahn et al. | 370/352 |

(Continued)

FOREIGN PATENT DOCUMENTS

WO   WO 2008/062153 A2   5/2008

*Primary Examiner* — Charles Appiah
*Assistant Examiner* — Jaime Holliday
(74) *Attorney, Agent, or Firm* — Harrington & Smith (57) ABSTRACT

An apparatus and a method are provided. The provided solution includes an apparatus including a transceiver to be in wireless connection with one or more sets of user equipment and a controller configured to connect to the Internet, set up a virtual point-to-point connection to a second apparatus, set up and provide end-to-end call services using the virtual point-to-point connection between user equipment which are connected to and served by the apparatuses.

29 Claims, 6 Drawing Sheets

(56) References Cited

U.S. PATENT DOCUMENTS

| | | | |
|---|---|---|---|
| 2010/0202458 A1* | 8/2010 | Sato | 370/392 |
| 2011/0176531 A1* | 7/2011 | Rune et al. | 370/338 |
| 2011/0225424 A1* | 9/2011 | Zee et al. | 713/171 |
| 2012/0142359 A1* | 6/2012 | Lewis et al. | 455/445 |
| 2013/0137423 A1* | 5/2013 | Das et al. | 455/426.1 |

\* cited by examiner

APPARATUS AND METHOD OF PROVIDING END-TO-END CALL SERVICES

FIELD

The embodiments of the invention relate generally to communication networks and, more particularly, to an apparatus and a method in communication networks.

BACKGROUND

Communication systems have been under extensive development in recent years. Several new services have been developed. Different data and multimedia services are attractive to users, and communication systems should provide a sufficient quality of service.

The popularity of Internet-based services has increased. One of such services is Internet-based voice calls (Voice-over-IP) where a speech or video phone call is realized with an Internet Protocol (IP) connection between personal computers.

The developed wireless communicating systems are utilizing IP-based connections and provide browsing and other IP-based services to customers. The users expect to have similar service using wireless user equipment as personal computers.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus comprising: a transceiver to be in wireless connection with one or more sets of user equipment; a controller configured to connect to the Internet, set up a virtual point-to-point connection to a second apparatus, set up and provide end-to-end call services using the virtual point-to-point connection between user equipment which are connected to and served by the apparatuses.

The controller of the apparatus may be configured to set up a virtual point-to-point connection to the second apparatus utilizing an Internet Protocol tunneling mechanism within the network of an operator.

According to an aspect of the present invention, there is provided an apparatus comprising: a transceiver to be in wireless connection with a first network element; a controller configured to control the transceiver to send a message to the first network element, the message comprising a request to establish an end-to-end call service with a second apparatus utilizing a virtual point-to-point connection to a second network element to which the second apparatus is connected.

The controller of the apparatus may be configured to control the transmitter to receive from the first network element information on apparatuses currently connected to the first network element and the second network element.

According to another aspect of the present invention, there is provided a method comprising: maintaining a wireless connection between a first network element and one or more sets of user equipment; connecting the first network element to the Internet; setting up a point-to-point connection to a second network element, setting up and providing end-to-end call services using the virtual point-to-point connection between user equipment which are connected to and served by the network elements.

According to another aspect of the present invention, there is provided a method comprising: maintaining a wireless connection with a first network element; sending a message to the first network element, the message comprising a request to establish an end-to-end call service to a second apparatus utilizing a virtual point-to-point connection to a second network element to which the second apparatus is connected.

According to another aspect of the present invention, there is provided a system, comprising: one or more sets of user equipment; one or more apparatuses configured to be in wireless connection with one or more sets of user equipment and to connect to the Internet, set up a virtual point-to-point connection to another apparatus, set up and provide end-to-end call services using the virtual point-to-point connection between user equipment which are connected to and served by the apparatuses.

A chipset may comprise the apparatus discussed above.

According to another aspect of the present invention, there is provided a computer program comprising program code means adapted to perform the methods discussed above.

According to another aspect of the present invention, there is provided an article of manufacture comprising a computer readable medium and embodying program instructions thereon executable by a computer operably coupled to a memory, which, when executed by the computer, perform methods discussed above.

According to another aspect of the present invention, there is provided an apparatus comprising: means for being in wireless connection with one or more sets of user equipment; means for connecting to the Internet, means for setting up a virtual point-to-point connection to a second apparatus, and means for setting up and providing end-to-end call services using the virtual point-to-point connection between user equipment which are connected to and served by the apparatuses.

According to another aspect of the present invention, there is provided an apparatus comprising: means for being in wireless connection with a first network element; and means for sending a message to the first network element, the message comprising a request to establish an end-to-end call service to a second apparatus utilizing a virtual point-to-point connection to a second network element to which the second apparatus is connected.

Although the various aspects, embodiments and features of the invention are recited independently, it should be appreciated that all combinations of the various aspects, embodiments and features of the invention are possible and within the scope of the present invention as claimed.

LIST OF DRAWINGS

Embodiments of the present invention are described below, by way of example only, with reference to the accompanying drawings, in which.

DESCRIPTION OF EMBODIMENTS

Exemplary embodiments of the present invention will now be de-scribed more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

Embodiments are applicable to any base station, user equipment, server, corresponding component, and/or to any communication system or any combination of different communication systems that support required functionalities.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiments.

Modern communications systems under development provide a possibility to install local area (LA) base stations in the network. These base stations may be installed within buildings to provide additional coverage and capacity in homes and offices. These base stations may utilize so-called "plug-and-play" operation with a self-organizing network (SON) and flexible spectrum use (FSU) techniques.

Main targets of these techniques are to minimize the need for network configuration and enable new types of communications networks, such as decentralized ad hoc networks. The techniques enable self-tuning and reconfiguration of network parameters of the LA base stations. In addition, the techniques provide some solutions for utilizing and sharing spectrum resources among communication systems of the same or different operators serving in an overlapping or even common spectrum and/or geographical area.

In the following, different embodiments will be described using, as an example of a system architecture whereto the embodiments may be applied, an architecture based on Evolved UMTS Terrestrial Radio Access (E-UTRA, UMTS=Universal Mobile Telecommunications System) without restricting the embodiment to such an architecture, however.

Many different radio protocols to be used in communications systems exist. Some examples of different communication systems are the universal mobile telecommunications system (UMTS) radio access network (UTRAN or E-UTRAN), long term evolution (LTE, also known as E-UTRA), long term evolution advanced (LTE-A), Wireless Local Area Network (WLAN), worldwide interoperability for microwave access (WiMAX), Bluetooth®, personal communications services (PCS) and systems using ultra-wideband (UWB) technology.

In an E-UTRA network the base stations may be called Enhanced Node Bs (eNB). These base stations may be called Wide Area (WA) base stations.

In the E-UTRA network the local area (LA) base stations may be called home node Bs (HNB) or local node Bs (LNB). A home node B may be a wireless access point that may be purchased and/or installed by a private user, for example in the user's home.

Figure 1:
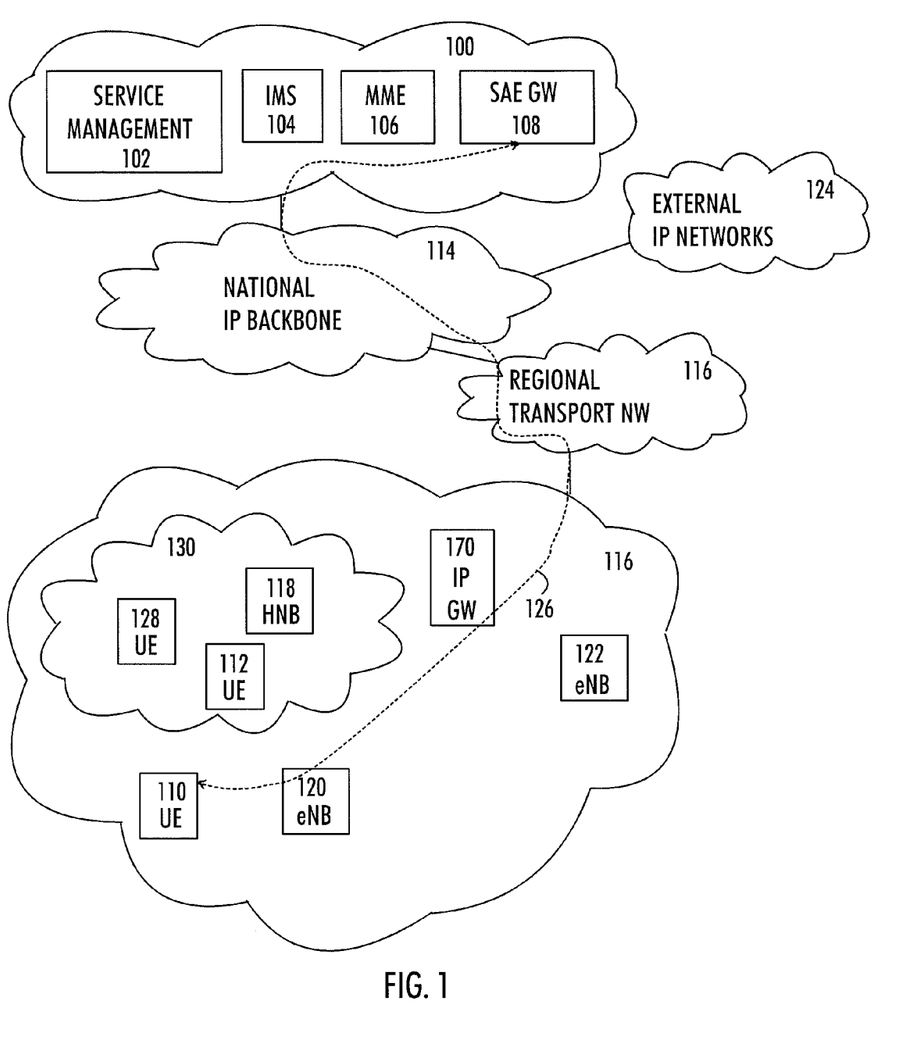
FIG. 1 illustrates an example of a radio access network structure to which embodiments of the invention may be applied.

FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for group communication are irrelevant to the actual invention. Therefore, they need not to be discussed in more detail here.

In the example of FIG. 1, the radio system is based on LTE/SAE (Long Term Evolution/System Architecture Evolution) network elements. However, the invention described in these examples is not limited to the LTE/SAE radio systems but can also be implemented in other radio systems, such as HSDPA (high speed downlink packet access), HSUPA (high speed uplink packet access), or in other suitable radio systems.

The exemplary radio system of FIG. 1 comprises a service core 100 of an operator including the following elements: a service management 102, IMS (IP multimedia subsystem) 104, a MME (Mobility Management Entity) 106, and a SAE GW (SAE Gateway) 108.

Traffic between mobile terminals 110, 112, 128 and the service core network 100 is carried out via a national IP backbone network 114, a regional transport network 116, and a local area aggregation network 116. eNBs (Enhanced node Bs) 118 to 122 of the radio system host the functions for Radio Resource Management: Radio Bearer Control, Radio Admission Control, Connection Mobility Control, Dynamic Resource Allocation (scheduling). The MME 106 is responsible for distributing paging messages to the eNBs 118 to 122.

The example of FIG. 1 comprises a local area base station HNB 118 forming a cell 130. The HNB may be privately purchased and owned. The owner of the HNB 118 may form a user group of the UEs which are allowed to access the HNB. Such a group may be called a closed subscriber group CSG. Typically, only the members of the CSG of a HNB are allowed to contact the HNB. In an embodiment, more than one HNB form a CSG Network. For example, one home may be covered by more than one HNB sharing the same CSG.

Current radio networks are based on a single switch model. This is implemented in the LTE/SAE network by the SAE GW (SAE Gateway) 108. All calls are "long distance" because the user traffic is forced to pass via the SAE GW 108. For example, a connection from a mobile terminal 110 (connected to the eNodeB 120) to an external IP network 124, such as to the Internet 124, is typically guided via a route indicated with a dashed line 126. Likewise, a speech call from the mobile terminal 110 to another mobile terminal of the system is routed through the SAE GW 108.

Recently, cellular operators have started to offer local IP (Internet Protocol) connectivity within a certain area (local IP breakout). The user equipment 110, 112, 128 may connect to the Internet using a local gateway via a eNodeB instead of the SAE GW 108. Thus, all data is not required to traverse via the centralized SAE GW 108. The local gateway may be implemented as a separate IP Gateway server (or access router) 170.

In an embodiment, the server functionality is implemented in the eNodeB. For example, a HNB may be implemented to connect to the Internet through a high-speed DSL Internet connection available in the location of the HNB. Thus, the user equipment 112 may connect to the Internet through the HNB 118 which acts as a gateway to the Internet.

Figure 2:
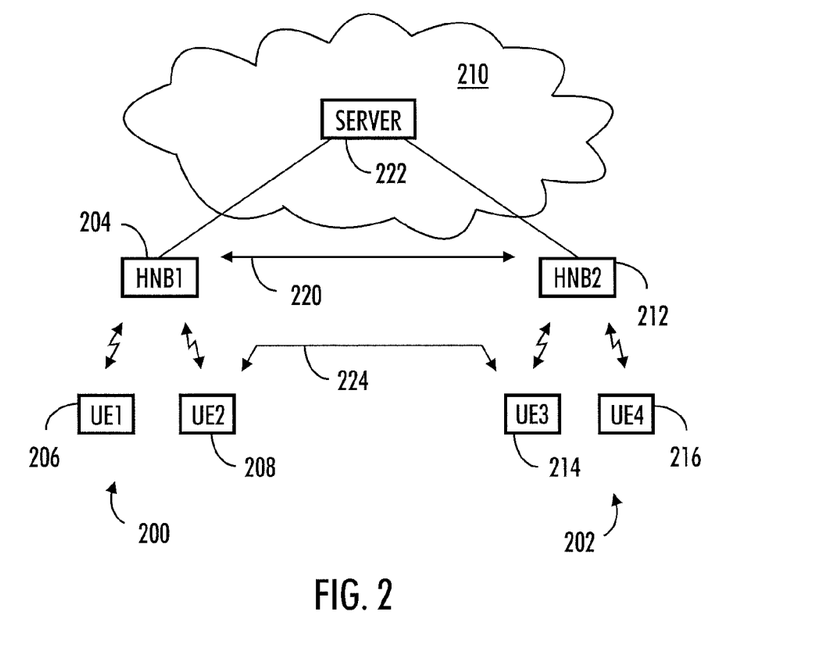
FIG. 2 illustrates an embodiment of the invention.

FIG. 2 illustrates an embodiment of the invention. Let us assume that two acquainted families live in different countries, in Finland and France. The families call each other on a regular basis. FIG. 2 shows two CSG Networks 200, 202 in different locations, for example Oulu, Finland and Paris, France. The first CGS network comprises a Home NodeB 204 and UEs 206, 208 connected to the HNB 204 and belonging to the closed subscriber group 200. The second CGS network comprises a Home NodeB 212 and UEs 214, 216 connected to the HNB 212 and belonging to the closed subscriber group 202.

In this example, the HNB 204 and HNB 212 are configured to act as a gateway and connect to the Internet 210.

Conventional phone call between the CGS networks is a long distance call. A conventional Voice-over-IP call via Internet are realized by $3^{rd}$ party software and they do not use wireless cellular access. Therefore, many Voice-over-IP implementations are not supported by the cellular operators.

In the regular cellular-access end-to-end call operation, an eNodeB or an HNB provides a radio-access link to user equipment and an end-to-end call between two UEs is set up through one or more operators networks which are interconnected via transport networks such as the Internet or public telephone networks, etc. In this operation, the eNodeB or HNB is not visible on a transport layer for end-to-end data forwarding between the UEs. That is, point-to-point or peer-to-peer transport between the eNBs or HNBs which provide radio links to the UEs is not applied.

In an embodiment, virtual IP connectivity 220 between the CGS networks is created. The connectivity creates a tunneled connection through cellular operator(s)'s network(s) and/or the Internet between the CGS networks. The connection may be called a Virtual Breakout (VBO) connection. The VBO may be realized, for example, by utilizing an Internet Protocol tunneling mechanism within the network of an operator or between the networks of more than one operator. In an embodiment, the VBO is realized by utilizing an IP-connectivity-service-control mechanism such as registering at a common server 222 and advertising about reachability over the Internet. The server may belong to a $3^{rd}$ party.

In an embodiment, the common server may identify requesting acquainted HNBs and distribute keys and configurations to them to set up a secure VBO connection.

In an embodiment, a first HNB may register itself to a 3rd party server and check whether an acquainted HNB is also on-line. Then, the first HNB may select and connect to the acquainted HNB via the 3rd party server.

As a result of the VBO the HNBs and UEs of the CGS networks are aware of each other's on-line reachability and end-to-end connections between devices of different CGS networks can be fast and easily set up and utilized.

The UE 208 of a CGS network 200 may utilize the VBO connectivity 220 and request a Voice-over-IP call 224 to a UE 214 camped on the other CGS Network 202.

In an embodiment, the VBO connection of the HNBs is targeted to IP call services. Other Internet connections of the user equipment connected to an HNB are not utilizing the VBO connections. When the user equipment wishes to utilize Internet services it is required to connect to Internet before accessing the services. However, when user equipment wishes to place a call utilizing the VBO there is no need to set up an Internet connection. The user equipment may merely send a call set-up request to the HNB over the air interface using a normal call set-up control channels.

Figure 3A:
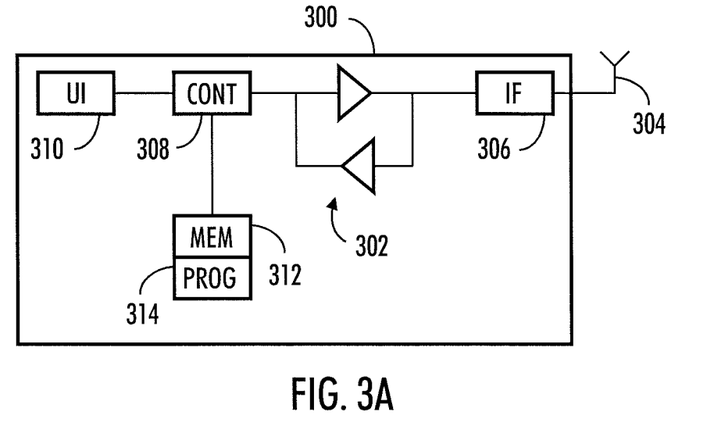
FIGS. 3A to 3C illustrate examples of apparatuses where embodiments of the invention may be applied.
Figure 3B:
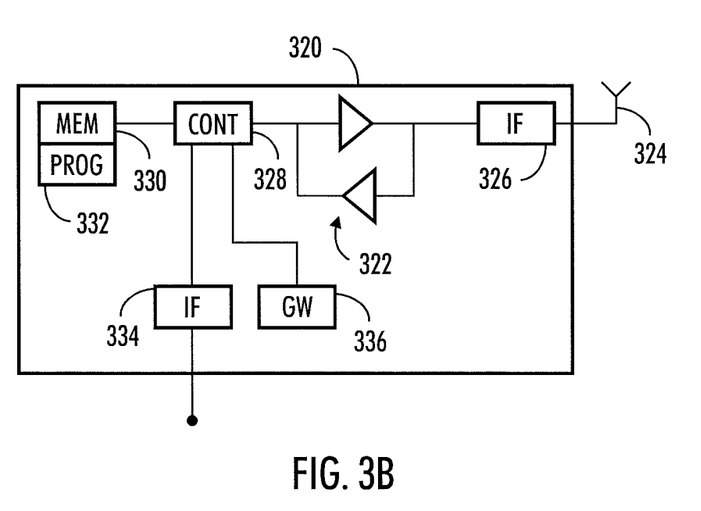
Figure 3C:
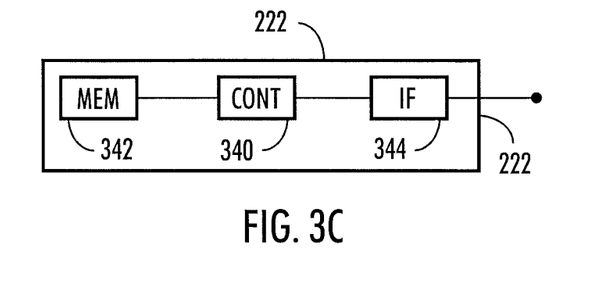

FIGS. 3A to 3C illustrate examples of apparatuses where embodiments of the invention may be applied. FIG. 3A illustrates an example of user equipment. The user equipment 300 comprises a transceiver 302 configured to communicate with one or more network elements such as a Home NodeB or an eNodeB. The transceiver 302 may be connected to an antenna arrangement 304 via an interface 306. The user equipment comprises a controller or processing unit 308 for controlling the functions of the user equipment. The controller 308 is typically implemented with a microprocessor, a signal processor or separate components and associated software. The user equipment 300 further comprises a user interface 310. The user interface may be realized with a display, a keyboard, a microphone and a speaker. The user equipment may comprise a memory 312 connected to the controller 308. The memory may store various software 314 and data required in the operation of the apparatus. The memory may be integrated into the controller.

FIG. 3B illustrates an example of a network element 320. The network element 320 comprises a transceiver 322 configured to communicate wirelessly with one or more sets of user equipment. The transceiver 322 may be connected to an antenna arrangement 324 via an interface 326. The antenna arrangement may comprise one or more antennas. The network element comprises a controller or processing unit 328 for controlling the functions of the network element. The controller 328 is typically implemented with a microprocessor, a signal processor or separate components and associated software. The network element 320 may comprise a memory 330 connected to the controller 328. The memory may store various software 332 and data required in the operation of the apparatus. The memory may be integrated into the controller. The network element may be connected to other network elements and to the Internet via an interface 334 connected to the controller 328.

In an embodiment, the network element comprises a second controller 336 for acting as a gateway between the network element and the Internet. The second controller 336 may be connected to the controller 328 and to the interface 334. In an embodiment, the tasks of the second controller are performed by the controller 328. In another embodiment, the network element is connected to the Internet via a separate gateway.

FIG. 3C illustrates an example of a network server 222. The server 222 comprises a controller or processing unit 340 for controlling the functions of the server. The controller 340 is typically implemented with a microprocessor, a signal processor or separate components and associated software. The server 222 may comprise a memory 342 connected to the controller 340. The memory may store various software and data required in the operation of the server. The memory may be integrated into the controller. The server 222 may be connected to the Internet via an interface 344.

FIGS. 4A to 4D are flow charts illustrating embodiments of the invention. It should be noted that the steps described below are in no absolute chronological order, and some of the steps may be performed simultaneously or in an order differing from the given one.

Figure 4A:
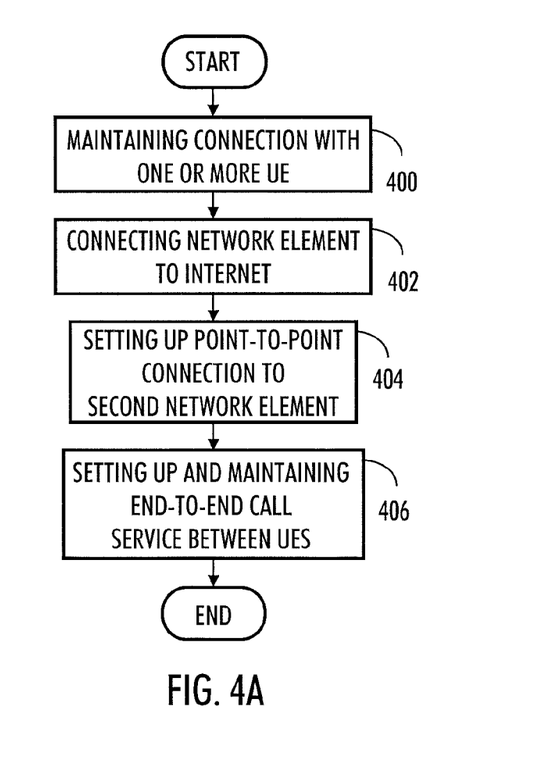
FIGS. 4A to 4D are flow charts illustrating embodiments of the invention.

In step 400 of FIG. 4A, a first network element maintains a connection with one or more sets of user equipment. The network element may be an HNB 320 serving a femto cell in a cellular system. The connection may be maintained by the transceiver 322. In an embodiment, the network element is configured to assign or map an identifier to the user equipment allowed to be in wireless connection with the apparatus.

The identifier may be a customized nickname or user ID that may be used in end-to-end calls instead of regular phone numbers. In an embodiment, the identifier is generated by the UE which registers the identifier to the HNB.

In step 402 the first network element is connected to the Internet. An HNB may comprise software 332 instructing the controller of the HNB to connect the HNB to the Internet automatically when powered up. Alternatively, the HNB may be commanded to connect to the Internet by the user or owner of the device. The connection may be established through a local gateway or the HNB itself may be configured to act as a gateway under control of the home-domain operator's network. The UEs using the network element or HNB form a closed subscriber group. In an embodiment, the HNB and femto cell of the HNB are a part of the operator's cellular system. Thus the HNB activation or power-up and cell configuration is controlled by the network.

In step 404, a virtual point-to-point or peer-to-peer (P2P) connection to a second network element is established. The HNBs of acquainted closed subscriber groups may comprise software 332 instructing the controller 328 of the HNBs to connect the HNBs to each other when reactivated and connected to the Internet. In other words, a secure virtual P2P connection may be established between such HNBs either manually at a certain point in time or semi-autonomously whenever the HNBs are reactivated and visible/reachable on-line.

In step 406, end-to-end call services between the sets of user equipment which are connected to and served by the apparatuses using the virtual P2P connection are set up and maintained utilizing the virtual P2P connection.

Figure 4B:
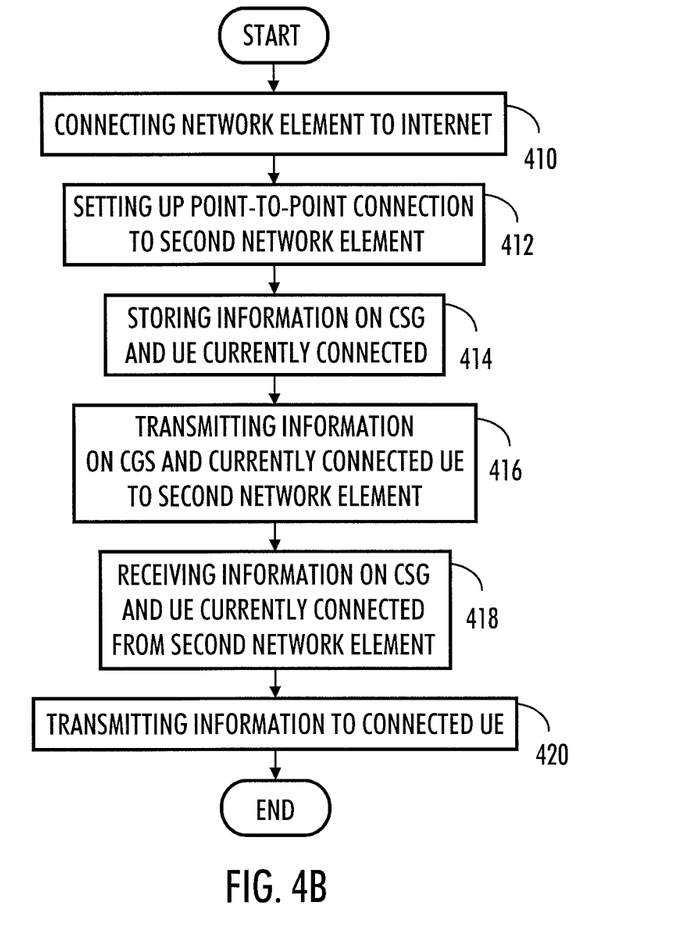

The flow chart of FIG. 4B illustrates another embodiment of the invention.

The steps 410 and 412 correspond to the steps 402 and 404 of FIG. 4A.

In step 414, information on user equipment allowed to be in wireless connection with the network element and on user equipment currently connected to the network element is maintained in a memory 330 in the HNB. The information may comprise the identifier (nickname or used ID) assigned to each set of the user equipment. The HNB keeps a list of the user equipment belonging to the closed subscriber groups of the HNB. In addition, the HNB naturally keeps track of user equipment currently connected to the HNB. The connection may be either idle or active. In active mode the user equipment is communicating on a traffic channel. In idle mode, there is a control channel connection between the user equipment and the network element.

In step 416, information on user equipment allowed to be in wireless connection with the network element and on user equipment currently connected to the network element is transmitted to the second network element or the HNB.

In step 418, information on user equipment allowed to be in wireless connection with the second HNB and on user equipment currently connected to the second HNB is received from the second HNB. The HNB may store this information.

In step 420, the received information is sent to the user equipment connected to the network element. The information may comprise the identifiers of the user equipment connected to other HNBs. The information may be sent to the user equipment using common-control signaling via a broadcast channel or using dedicated signaling. The HNB may page the user equipment camping on the cell for initiating the information transfer.

Figure 4C:
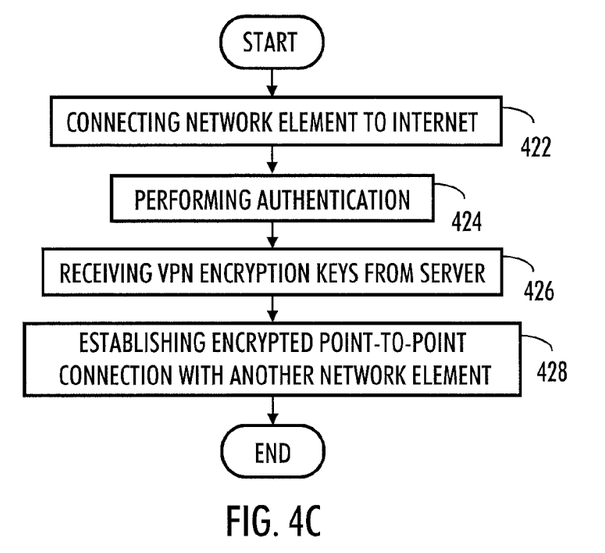

The flow chart of FIG. 4C illustrates an example of a possible realization of the step 412 described above.

In step 422 the first network element is connected to the Internet. In addition, the network element contacts a server 222 in the Internet. The server 222 may be a $3^{rd}$ party server, i.e. it may be maintained by a party not related to the cellular operator. The server is configured to establish and assist in maintaining a virtual P2P connection between network elements of cellular operators.

In step 424, the network element authenticates and registers itself at the server. The authentication may be performed using methods known in the art. To set up a secure P2P connection, the server must be sure of that the participating network elements are valid participants. By registering itself at the server the network element enables another network element to detect that the network element is online and may be reached. The second network element authenticates and registers itself as well.

After authentication and registration, the network element may check whether other network elements are online. The first network element may detect that the second network element with which it is configured to set up a connection is online. In such a case, the process may continue.

In step 426, the network element receives virtual private network (VPN) encryption keys from the server. In an embodiment, the virtual P2P connection between the network elements is realized as a secure VPN connection. The connection may be established using encryption requiring keys.

In step 428, the encrypted connection between the network elements via the server 222 is established. The virtual end-to-end connection between the network elements may be realized in many ways as one skilled in the art is well aware. The above method is merely an example.

Figure 4D:
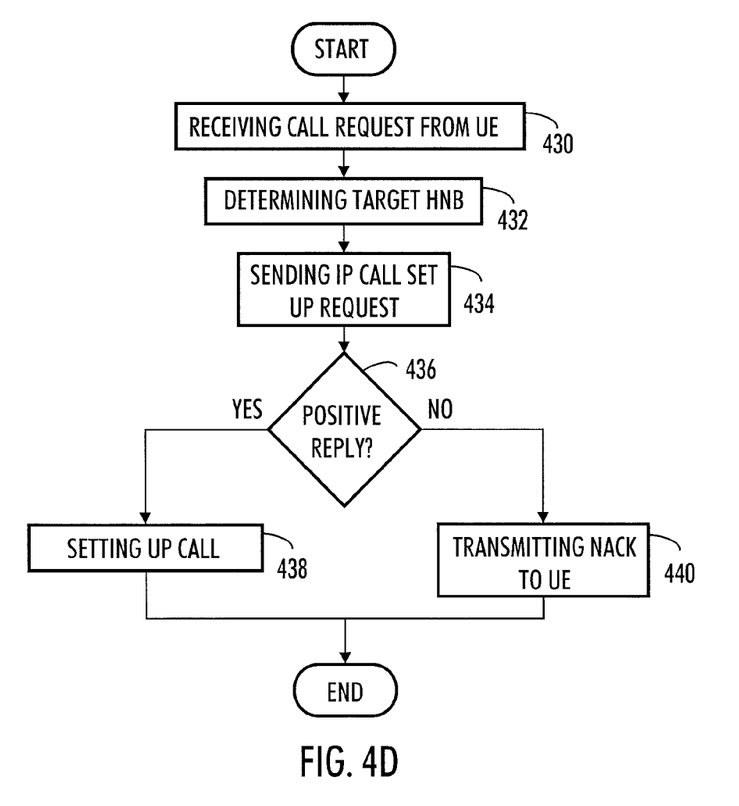

The flow chart of FIG. 4D illustrates another embodiment of the invention.

In step 430 a first HNB receives a message from user equipment wirelessly connected to the HNB, the message comprising a request to set up an end-to-end call to user equipment connected to a second HNB. The first HNB has a virtual end-to-end connection to the second HNB. The message comprises a request to establish the call using the virtual P2P connection between the HNBs. The message may comprise the identification (nickname or user ID) of the user equipment to which the connection is to be established.

In step 432, the first HNB determines the target HNB on the basis of the identification information. This step may be required if the first HNB has virtual P2P connections with several HNBs. The first HNB may determine the $3^{rd}$ party server which is used in the realization of the P2P connection.

In step 434, the first HNB sends an end-to-end IP call set-up request to the second HNB. The second HNB may page the target user equipment to establish the radio connection needed for the call.

In step 436, the first HNB waits for a reply from the second HNB.

If the reply was positive, the end-to-end call is set up in step 438.

If the reply was negative, the first HNB informs 440 the user equipment that requested the connection information that the connection failed. A negative reply occurs if the target user equipment refuses the call, for example.

Thus, a new mode of service network access points, referred to as VBO mode, is introduced to enable user equipment which are camping on or connected to HNBs having a P2P connection between them to utilize the P2P connection for calling each other. In other words, HNBs and UEs are facilitated with necessary access-stratum and non-accessstratum functions including application programming interfaces (API) and IP-call server/controller functionality to support the VBO mode.

Figure 5:
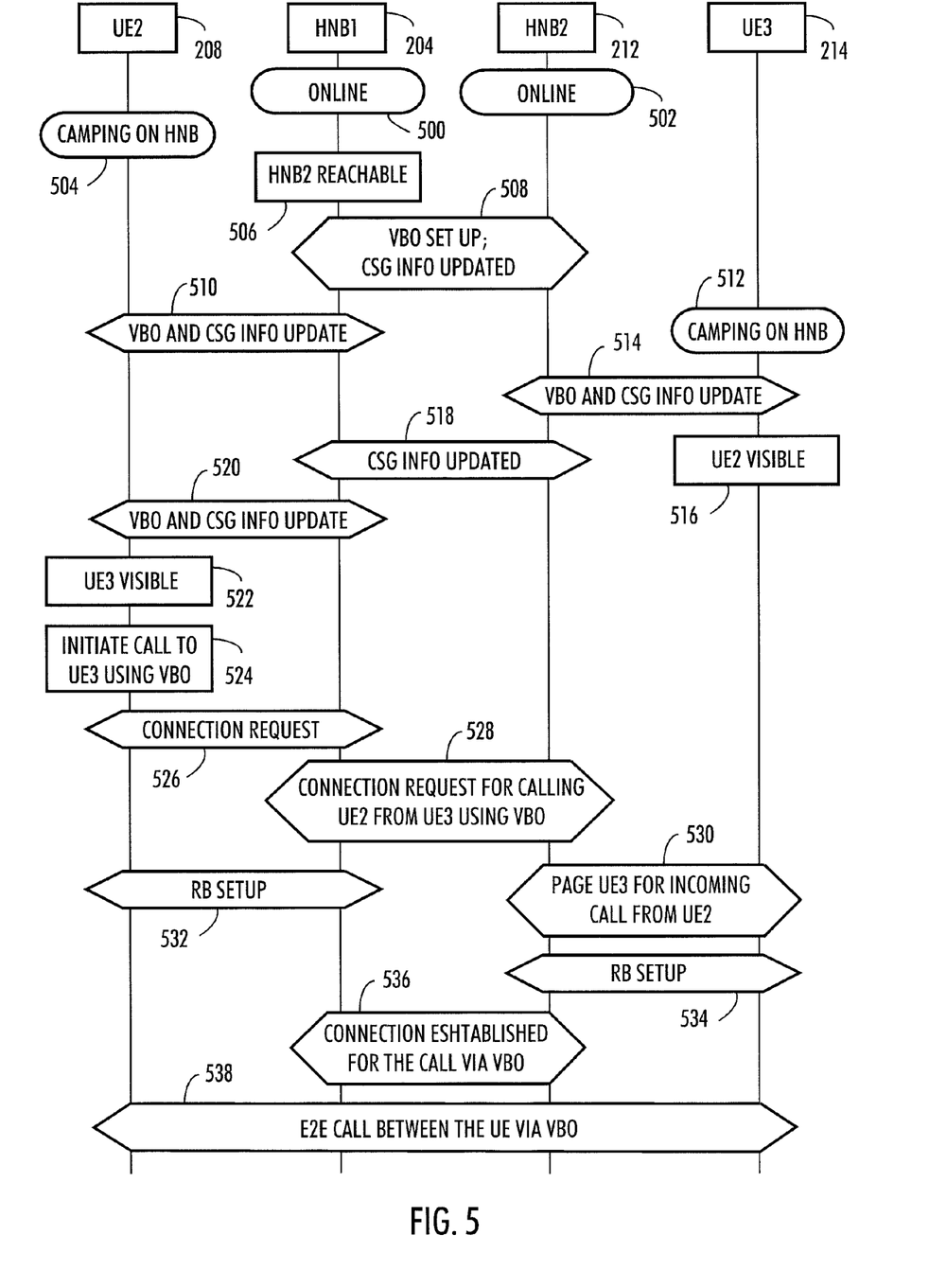
FIG. 5 is a signalling chart illustrating an embodiment.

FIG. 5 is a signalling chart illustrating an example of basic signalling mechanisms and procedures for end-to-end calls according to an embodiment of the invention.

FIG. 5 illustrates an example of the signalling and procedures of the UE2 208 camping on the HNB1 204 and the UE3 214 camping on the HNSB2 as illustrated in FIG. 2.

The HNBs 204, 212 are switched online and connected to the Internet 500, 502.

The user equipment 208 camps 504 on the HNB 204.

The HNB1 contacts the server 222 and obtains information 506 that the HNB2 is online and reachable.

The virtual P2Pd connection between the HSB1 and the HSB2 is set up 508 utilizing the server 222. The closed subscriber group information (CSG INFO) of the HNBs is updated between the HNBs. The information may comprise data on the UEs belonging to the CSG of each HNB and data on the currently camped UEs. In this case, only the UE2 is camping on the HNB1.

The HNB1 sends an update 510 of the closed subscriber group information to the UE2. In addition, the HNB1 informs the UE2 about availability of the P2P connection to the HNB2 and the VBO mode support.

Next, the UE3 connects 512 to the HNB2.

The HNB2 informs 514 the UE3 about the P2P connection and the closed subscriber group information.

The UE2 becomes visible 516 to the UE3.

The closed subscriber group information is updated 518 between the HNB1 and the HNB2.

HNB1 sends an update 520 of the closed subscriber group information to UE2.

Thus, the UE3 becomes visible 522 to the UE2. The UE2 is aware that the UE3 is camping on the HNB2 with which the HNB1 has a virtual P2P connection.

Next, the UE2 wishes 524 to make a call to the UE3 utilizing the P2P connection, that is, using the VBO mode.

The UE2 transmits a call set up request 526 to the HNB1, the request indicating the identification of the UE3 and information that the call should utilize the P2P connection between the HNB1 and the HNB2, that is, using the VBO mode.

The HNB1 transmits 528 a connection request to the HNB2 for calling UE3 utilizing the P2P connection.

The HNB2 pages 530 the UE3 for incoming call from the UE2.

Next, radio bearer setup 532, 534 is performed between the HNB1 and the UE2 and between the HNB2 and the UE3.

The connection for the call between the HNBs is established 536 and finally, the end-to-end call between the user equipment via the virtual P2P connection between the HNBs is established 538.

It should be understood that the apparatuses of FIGS. 3A to 3C are depicted herein as an example illustrating some embodiments. It is apparent to a person skilled in the art that the apparatuses may also comprise other functions and/or structures. Although the apparatuses are depicted as single entities, different modules and memory may be implemented in one or more physical or logical entities.

An apparatus may be any server, node, host or corresponding component providing a required functionality. The apparatus may also be a user device which is a piece of equipment or a device that associates, or is arranged to associate, the user device and its user with a subscription and allows a user to interact with a communications system. The user device presents information to the user and allows the user to input information. In other words, the user device may be any terminal capable of receiving information from and/or transmitting information to the network, connectable to the network wirelessly or via a fixed connection. Examples of the user devices include a personal computer, game console, laptop (notebook), personal digital assistant (PDA), pager, mobile television, mobile station, and line telephone.

The apparatuses of FIGS. 3A to 3C may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

The apparatuses of FIGS. 3A to 3C may be implemented using at least one chipset or integrated circuit such as ASICs (application-specific integrated circuit).

Embodiments of the invention may be implemented as computer software executable by a processor, or as a combination of software and hardware.

An embodiment provides a computer program embodied on a distribution medium, comprising program instructions which, when loaded into an electronic apparatus, perform the actions of the controller, transmitter, receiver and other units of the apparatuses described earlier.

The computer program may be in source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital computer or it may be distributed amongst a number of computers.

The steps, signaling messages and related functions described above are in no absolute chronological order, and some of the steps may be performed simultaneously or in an order differing from the given one. Other functions can also be executed between the steps or within the steps and other signaling messages sent between the illustrated messages. Some of the steps or part of the steps can also be left out or replaced by a corresponding step or part of the step.

It will be obvious to a person skilled in the art that, as technology advances, the inventive concept can be implemented in various ways. The invention and its embodiments are not limited to the examples described above but may vary within the scope of the claims.

The invention claimed is:

1. A first apparatus comprising:
    a transceiver configured to be in wireless connection with
        a first set of user equipments comprising at least a first user equipment; and
    a controller configured to:
        connect to the Internet,
        set up a virtual point-to-point connection to a second apparatus,
        set up and provide end-to-end call services using the virtual point-to-point connection between the first user equipment which is connected to and served by the first apparatus, and a second user equipment of a second set of user equipments, said second user equipment connected to and served by the second apparatus, receive from the second apparatus information on user equipments of the second set allowed to be in wireless connection with the second apparatus and on user equipments of the second set currently connected to the second apparatus, and control the transceiver to transmit information on the second user equipment currently connected to the first apparatus and the second apparatus to the first user equipment currently connected to the first apparatus.

2. The first apparatus of claim 1, wherein the first apparatus is configured to store information on user equipments of the first set allowed to be in wireless connection with the first apparatus and on user equipments of the first set currently connected to the first apparatus.

3. The first apparatus of claim 2, wherein the controller is further configured to send the stored information to the second apparatus.

4. The first apparatus of claim 1, wherein the controller is configured to set up a virtual point-to-point connection to the second apparatus utilizing an Internet Protocol tunneling mechanism within the network of an operator.

5. The first apparatus of claim 1, wherein the controller is configured to set up a virtual point-to-point connection to the second apparatus utilizing an Internet Protocol tunneling mechanism between the networks of more than one operator.

6. The first apparatus of claim 1, wherein the controller is configured to set up a virtual point-to-point connection to the second apparatus utilizing a server connected to the Internet.

7. The first apparatus of claim 6, wherein the controller is configured to provide the server with the authentication of the first apparatus and receive virtual private network encryption keys from the server to be applied to the virtual point-to-point connection.

8. The first apparatus of claim 1, wherein the transceiver is configured to receive a message from the first user equipment wirelessly connected to the first apparatus, the message comprising a request to set up an end-to-end call to the second user equipment connected to the second apparatus, and a request to establish the call using the virtual point-to-point connection between the first and second apparatuses.

9. The first apparatus of claim 1, wherein the controller is configured to control the transceiver to receive from the second apparatus an end-to-end call set up request, the request comprising an identification of the first user equipment wirelessly connected to the first apparatus, the transceiver is configured to send the call request to the first user equipment and receive a reply from the first user equipment, and the controller is further configured to set up the end-to-end call after receiving a positive reply to the request.

10. The first apparatus of claim 1, wherein the first apparatus is configured to assign or map an identifier to user equipments of the first set allowed to be in wireless connection with the first apparatus.

11. The first apparatus of claim 1, wherein the controller is configured to maintain a virtual point-to-point connection with the second apparatus and with at least a third apparatus serving a third set of user equipments at the same time.

12. The first apparatus of claim 11, wherein the controller is configured to control the transceiver to transmit information on the second and the third apparatuses with which each of the respective apparatus has a virtual point-to-point connection to the user equipment or equipments of the first set currently connected to the first apparatus.

13. The apparatus of claim 1, wherein the first apparatus is a home nodeB serving a cell in a cellular system.

14. A chipset comprising the first apparatus of claim 1.

15. A method comprising:

maintaining a wireless connection between a first network element and a first set of user equipments comprising at least a first user equipment;

connecting the first network element to the Internet;

setting up a point-to-point connection to a second network element;

setting up and providing end-to-end call services using the virtual point-to-point connection between the first user equipment which is connected to and served by the first network element, and a second user equipment of a second set of user equipments, said second user equipment connected to and served by the second network element;

receiving from the second network element information on user equipments of the second set allowed to be in wireless connection with the second network element and on user equipments of the second set currently connected to the second network element; and transmitting information on the second user equipment currently connected to the first network element and the second network element to the first user equipment currently connected to the first network element.

16. The method of claim 15, further comprising:

storing information on user equipments of the first set allowed to be in wireless connection with the first network element and on user equipments of the first set currently connected to the first network element.

17. The method of claim 15, further comprising: sending the stored information to the second network element.

18. The method of claim 15, further comprising: the first network element setting up a virtual point-to-point connection to the second network element utilizing an Internet Protocol tunneling mechanism within the network of an operator.

19. The method of claim 15, further comprising: the first network element setting up a virtual point-to-point connection to the second network element utilizing an Internet Protocol tunneling mechanism between the networks of more than one operator.

20. The method of claim 15, further comprising: the first network element setting up a virtual point-to-point connection to the second network element utilizing a server connected to the Internet.

21. The method of claim 20, further comprising:

the first network element providing the server with the authentication of the first network element and receive virtual private network encryption keys from the server to be applied on the virtual point-to-point connection.

22. The method of claim 15, further comprising:

receiving at the first network element a message from the first user equipment wirelessly connected to the first network element, the message comprising a request to set up an end-to-end call to the second user equipment connected to the second network element, and a request to establish the call using the virtual point-to-point connection between the network elements.

23. The method of claim 15, further comprising:

the first network element receiving from the second network element an end-to-end call set up request, the request comprising an identification of the first user equipment wirelessly connected to the first network element and a request to establish the call using the virtual point-to-point connection between the network elements, sending the call request to the first user equipment and receiving a reply from the first user equipment, and setting up the end-to-end call after receiving a positive reply to the request.

24. The method of claim 15, further comprising:

assigning or mapping an identifier to user equipments of the first set allowed to be in wireless connection with the network element.

25. The method of claim 15, further comprising:

the first network element maintaining a virtual point-to-point connection to the second network element and at least a third network element serving a third set of user equipments at the same time.

26. The method of claim 15, further comprising:

the first network element transmitting information on the second and the third network elements with which the first network element has a virtual point-to-point connection to the user equipment or equipments of the first set currently connected to the first network element.

27. The method according to claim 15, performed by a computer running a computer program stored in a memory.

28. The method according to claim 15, performed by an article of manufacture comprising a computer readable memory storing thereon program instructions executable by a computer operably coupled to the memory.

29. A first apparatus comprising:

means for being in wireless connection with a set of user equipments comprising at least a first user equipment;

means for connecting to the Internet;

means for setting up a virtual point-to-point connection to a second apparatus;

means for setting up and providing end-to-end call services using the virtual point-to-point connection between the first user equipment which is connected to and served by the first apparatus and a second user equipment of a second set of user equipments, said second user equipment connected to and served by the second apparatus;

means for receiving from the second apparatus information on user equipments of the second set allowed to be in wireless connection with the second apparatus and on user equipments of the second set currently connected to the second apparatus, and means for controlling the transceiver to transmit information on the second user equipment currently connected to the first apparatus and the second apparatus to the first user equipment currently connected to the first apparatus.

* * * * *